United States Patent [19]

Teramachi

[11] Patent Number: 4,979,844
[45] Date of Patent: Dec. 25, 1990

[54] BALL JOINT AND MANUFACTURING METHOD OF THE SAME

[76] Inventor: Hiroshi Teramachi, 34-8, Higashitamagawa 2-chome Setagaya-ku, Tokyo, Japan

[21] Appl. No.: 492,268

[22] Filed: Feb. 28, 1990

Related U.S. Application Data

[63] Continuation of Ser. No. 84,060, Aug. 11, 1987, abandoned.

[51] Int. Cl.⁵ .............................................. F16C 11/00
[52] U.S. Cl. ...................................... 403/134; 403/39; 403/122; 384/489
[58] Field of Search .................. 403/38, 39, 122, 124, 403/77, 134; 384/489

[56] References Cited

U.S. PATENT DOCUMENTS

| | | | |
|---|---|---|---|
| 1,912,095 | 5/1933 | Randall | 403/77 |
| 3,273,923 | 9/1966 | Ulderup | 403/134 |
| 3,952,390 | 4/1976 | Amos | 29/149.5 B |
| 4,755,078 | 7/1988 | Blumberg et al. | 403/134 |
| 4,890,949 | 1/1990 | Wood, Jr. | 403/77 |
| 4,904,106 | 2/1990 | Love | 403/39 |
| 4,921,368 | 5/1990 | Busse et al. | 403/134 |

FOREIGN PATENT DOCUMENTS

| | | |
|---|---|---|
| 1297411 | 6/1969 | Fed. Rep. of Germany . |
| 47-11002 | 4/1972 | Japan . |
| 48-16109 | 5/1973 | Japan . |
| 1121004 | 8/1966 | United Kingdom . |
| 1217305 | 12/1970 | United Kingdom . |
| 1260084 | 1/1972 | United Kingdom . |
| 2103532 | 2/1983 | United Kingdom . |

OTHER PUBLICATIONS

Marks' Standard Handbook For Mechanical Engineers; Baumeister, Avallone and Baumeister; ©1958, Sect. 13 p. 40.

Primary Examiner—Randolph A. Reese
Assistant Examiner—Carol I. Bordas
Attorney, Agent, or Firm—Armstrong, Nikaido, Marmelstein, Kubovcik & Murray

[57] ABSTRACT

This invention provides a ball joint and a manufacturing method of the same comprises a holder and a ball and rod which is rotatably and movably secured to this holder and a sealing member which is secured between the spherical body of the ball and rod and a sphere receiving portion of the holder. An oil basin to which a cover member is secured from outside is formed at the bottom portion of the sphere receiving portion of the holder, whereby smooth rotation and movement can be obtained.

3 Claims, 5 Drawing Sheets

BALL JOINT AND MANUFACTURING METHOD OF THE SAME

This application is a continuation of application Ser. No. 084,060 filed Aug. 11, 1987, now abandoned.

FIELD OF THE INVENTION AND RELATED ART

This invention relates to a ball joint and a manufacturing method of the same, and in particular relates to a ball joint and a manufacturing method of the same having an oil basin at the bottom portion of a sphere receiving portion of a holder for the purpose of obtaining smooth rotation or movement.

A conventionally known type of such a ball joint is one comprising a holder having a sphere receiving portion at one end and a connecting portion at the other end, a ball and rod in which one end thereof having a spherical body which is rotatably and movably positioned in the sphere receiving portion of the aforesaid holder and the other end having a connecting portion, and a sealing member which is secured to the portion between the aforesaid sphere receiving portion and a base portion of the connecting portion of the ball and rod. Lubricant such as grease is supplied between the above spherical body and the sphere receiving portion. The sealing member also prevents the entrance of dust and so forth into the portion between the spherical body and the sphere receiving portion (for example: Japanese Patent Publication No. 26109/1973).

A known method of manufacturing such a ball joint is, for example, that a spherical body is set as a core in a die for a holder. A die cast fusible alloy is cast into this die so as to cast the holder in which the spherical body is held in a sphere receiving portion. The spherical body which is held by this holder and the main body of a rod is welded in a friction welding manner. A ball and rod in which the spherical body thereof is held by the holder is thus formed. Then an outer force is applied between the sphere receiving portion of the aforesaid holder and the spherical portion of the ball and rod so as to form a space for the purpose of manufacturing a ball joint (Japanese Patent Publication No. 11002/1972) and so forth.

In this method, a spherical body having a smooth surface and high sphericity can be used to form a spherical portion of the ball and rod. Furthermore, the sphere receiving portion of the holder can be cast with this spherical body used as a core. As a result of this, this method has an advantage in that a hard chill layer can be formed on the inner surface of the sphere receiving portion.

In the ball joint, described hereinbefore, however, it is required that the clearance between the spherical body and the sphere receiving portion is as little as possible. The reason is that a large clearance between the spherical body and the sphere receiving portion causes the sphere receiving portion of the holder manufactured by casting to break if an impacting load is applied thereto. Furthermore, if the lubricant which is supplied between the spherical body and the sphere receiving portion has a high viscosity, such as grease, the lubricant enclosed in the sealing member cannot be sufficiently introduced between the spherical body and sphere receiving portion. As a result, the lubricant cannot be efficiently supplied to the whole portion between the spherical body and the sphere receiving portion, which will cause a seizure or the like during high speed operation and so forth.

In the aforesaid manufacturing method, there is no way to fix the spherical body which is used as a core in the die for casting the holder. The spherical body therefore sometimes moves by the flow of a die-cast fusible alloy when the alloy is cast into the die for casting the holder. The spherical body sometimes runs out which leaves a defective article. Furthermore, a high degree of skill is required to cast this die-cast fusible alloy, and therefore, this increases the complexity of production.

In the conventional manufacturing method, the ball and rod are formed by welding the spherical body and the main body of the rod in the following method. Two parts are brought into contact each other and they are relatively rotated under a pressure with the frictional heat at this time utilized, that is a frictional welding. The pressure applied at the time of frictional welding to the spherical body and the main body of the rod is extremely high. As a result of this high pressure and high frictional heat which are applied to the spherical body at the time of the frictional welding, the sphericity of the spherical body deteriorates. After it has become a ball and rod, the sphericity of the spherical body is thus diminished, and the high sphericity of the spherical body which has been produced loses its meaning. Further, it is necessary to provide a large clearance between the spherical body and the sphere receiving portion of the holder, so that the clearance compensates for the difference between the maximum diameter and the minimum. In order to form this large clearance, a large force is needed to be applied to the spherical body and the sphere receiving portion, which leads to unintentional breakage of the sphere receiving portion. Furthermore, in a case in which a plurality of the parts are combined to form a link mechanism, the large clearance between the aforesaid spherical body and the sphere receiving portion integrates, which causes the accuracy in conducting force and so forth to deteriorate. If the deterioration in sphericity of the spherical body becomes too large, it causes a large impacting force to be applied between two parts at the time of use, and thus causes the sphere receiving portion of the holder to be broken. Furthermore, in the case where the ball and rod are formed by frictional welding, the tempering process after welding must be carried out separately. Furthermore, an extended time between the welding process and the tempering process causes the welded portion to form a so-called delayed crack. The tempering must be, therefore, applied as soon as possible, and deburring is needed in the welded portion. As a result of this, the manufacturing process is thus restricted.

SUMMARY OF THE INVENTION

An object of the present invention, therefore, is to provide a ball joint having an oil basin at the bottom portion of the sphere receiving portion of the holder, and which can smoothly rotate and move.

A further object of the present invention is to provide a ball joint in which the spherical portion of the ball and rod has a high sphericity, as a result of which, the clearance between the spherical portion and the sphere receiving portion of the holder can be decreased. The shakiness between two parts is thus prevented so as to make the rotation and movement smooth. Furthermore, large impacting loads are prevented from occurring between these parts during use.

A still further object of the present invention is to provide a ball joint having an oil basin which is formed by forming an opening at the bottom portion of the sphere receiving portion of the aforesaid holder and securing a cover member to cover the opening. The opening is formed by a sphere supporting portion of the die which is used to fix the aforesaid spherical body at the time of casting the holder with use of the spherical body which forms the ball and rod as a core.

A further object of the present invention is to provide a ball joint wherein at the time of casting a holder with the use of the spherical body which forms the spherical portion of the ball and rod as a core, the diameter of the spherical body supporting portion of the die which is used to fix the aforesaid spherical body is designed to be substantially the same as or larger than the diameter of the main body of a rod which forms the connecting portion of the ball and rod. When projection welding the spherical body cast in this holder and the main body of the rod which forms the connecting portion of the ball and rod, the opening formed by this spherical body supporting portion at the bottom portion of the sphere receiving portion can be used as an entrance for a supporting electrode.

That is, the present invention provides a ball joint comprising a holder having a sphere receiving portion at one end thereof and a connecting portion at the other end, a ball and rod having a spherical portion at one end which is rotatably and movably held in said sphere receiving portion and having a connecting portion at the other end, a sealing member which is secured between said sphere receiving portion of said holder and a base portion of said connecting portion of said ball and rod, which accommodates a lubricant and acts to prevent the entrance of dust and so forth, an opening being formed at a bottom portion of said sphere receiving portion of said holder by a sphere supporting portion of a die for fixing said sphere when casing said holder with a sphere which forms said spherical portion of said ball and rod as a core, and an oil basin which is formed by positioning a cover member over said opening to seal the basin from the outside.

This invention provides a method of manufacturing a ball joint comprising a step of providing a spherical body having high sphericity as a core of a sphere receiving portion into a holder die member, said spherical body forming a ball and rod by fixing said spherical body between one of a die member and a sphere supporting portion having a diameter substantially same as or larger than the diameter of a main body of a rod which forms a connecting portion of said ball and rod, said sphere supporting portion being formed in the other die member, a step of casting a holder in which a spherical body is held in said sphere receiving portion by casting die-cast fusible alloy into said holder die member, a step of inserting a supporting electrode from an opening which is formed at the bottom portion of said sphere receiving portion and formed by said sphere receiving portion so as to support said spherical body from lower portion, a step of projection welding said spherical body and a main body of a rod so as to form a ball and rod in which a spherical body is held by a holder, a step of application of outer force between said sphere receiving portion of said holder and said spherical body of said ball and rod for the purpose of forming a space therebetween, a step of forming an oil basin by fitting a cover member to an opening having a diameter substantially same as or larger than the diameter of a connecting portion of said ball and rod which is formed by a sphere receiving portion of said die member.

In the ball joint according to the present invention, the holder is formed as that in which the sphere receiving portion thereof has an opening facing substantially at a right angle with respect to the connecting portion. The connecting portions which are respectively provided for the aforesaid holder side and the ball rod side may be the means such as outer threads or inner threads to connect with other members, where both the same means as one another or different means may be employed.

The diameter of the opening which is formed in the bottom portion of the sphere receiving portion of the holder preferably is substantially same as or larger than the diameter of the connecting portion of the ball and rod. The opening can be thus used as an entrance of a supporting electrode which supports the aforesaid spherical body at the time of joining by projection welding the spherical body casted in the holder and the main body of the rod which forms the connecting portion of the ball and rod.

Furthermore, thanks to manufacturing the ball and rod by projection welding the main body of the rod and the spherical body, the sphericity of the spherical body can be increased. That is, when projection welding the spherical body and the main body of the rod, the diameter of the opening which is formed by the spherical body supporting portion in the die is substantially same as or larger than the diameter of the main body of the rod, the diameter of the supporting electrode which supports the spherical body by being inserted into the opening and which becomes one side electrode at the time of projection welding can be substantially same as or larger than the diameter of the aforesaid main body of the rod. As a result of this, electric current can be concentrated into the portion between the spherical body and the main body of the rod at the time of projection welding, the welding in this portion can be performed efficiently. And simultaneously, the portion of the spherical body in contact with the supporting portion of the supporting electrode can keep its surface smoothness and sphericity and so forth.

The means for fixing a cover member which forms an oil basin which is formed in the bottom portion of the sphere receiving portion of the holder may be that an annular projection is formed in the circumference of the edge of the opening to which this cover member is fixed for the purpose of caulking the annular projection.

Furthermore, the method of manufacturing a ball joint equipped with a ball and rod having high sphericity at the sphere portion thereof will now be described. A spherical body having high sphericity is used in principle, then this spherical body and the main body of the rod may be projection welded. The method of this welding may be a laminated projection welding and so forth, and preferably would be a butt projection welding. The employment of the projection welding can decrease weld burrs, the deburring process of cutting the burrs and so forth is therefore needless. Furthermore, tempering of the welding portion can be easily performed by passing electric current again in the state after projection welding the spherical body and the main body of the rod. As a result of this, so-called delayed cracks which occur in the welded portion of, for example, in hard carbon steel by leaving for a long time after welding can be completely prevented by carrying out tempering continued after the welding.

Since the ball joint according to the present invention has an oil basin in the bottom portion of the sphere receiving portion of the holder, from which lubricant such as grease is supplied from both the upper and lower portions of the portion between the spherical body of the ball and rod and the sphere receiving portion of the holder, the lubricant can be red smoothly. The lubricant can be thus efficiently supplied to the portion between this spherical body and the sphere receiving portion. Thanks to this efficient supply of the lubricant, smooth rotation and movement can be achieved even at high speed operation and so forth without problems such as seizing and so forth.

Furthermore, according to the present invention, the spherical body used as a core is fixed by one of the die members and the spherical body supporting portion which is provided on the other die member, the spherical body can be prevented from runout by cast die-cast fusible alloy, thanks to which, defects can be prevented from being generated. Since the spherical body and the main body of the rod is joined by the projection welding, a ball and rod with the use of a spherical body displaying a high sphericity can be manufactured without any deterioration in its sphericity. Furthermore, the sphere receiving portion of the holder is casted with the use of this spherical body having high sphericity as a core, the clearance between this sphere receiving portion and the spherical body can be arranged as minimum as possible to meet requirements. As a result of which a large impacting force can be thus prevented during usage, and a ball joint displaying large durability can be thus manufactured.

DETAILED DESCRIPTION OF PREFERRED EMBODIMENTS

Referring to the accompanying drawings, an embodiment of a ball joint according to the present invention will now be described.

Figure 1:
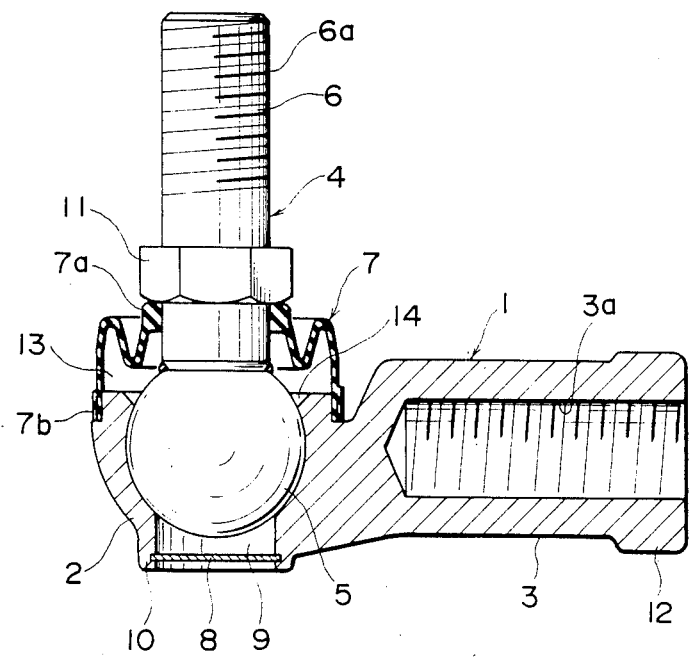
FIG. 1 is a cross sectional view illustrating a ball joint of an embodiment of the present invention.
Figure 2:
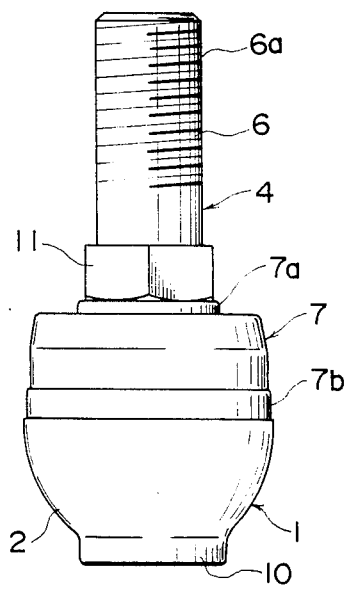
FIG. 2 is a left side view of FIG. 1.
Figure 3:
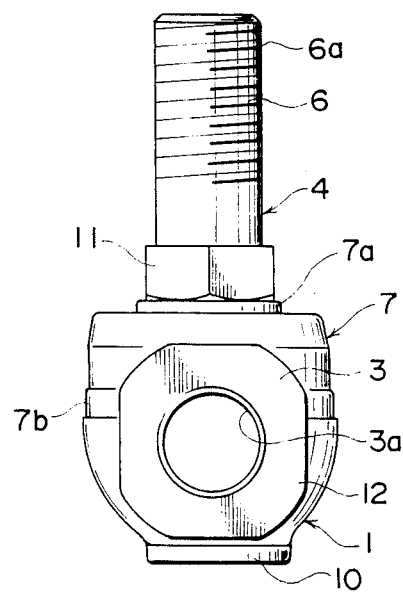
FIG. 3 is a right side view of FIG. 1.

FIGS. 1 to 3 illustrate a ball joint of one embodiment of the present invention. This ball joint comprises a holder 1 having a spherical receiving portion 2 at one end thereof and a connecting portion 3 at the other end thereof. It further comprises a ball and rod 4 at one end thereof having a spherical receiving portion 2 at one end thereof and a connecting portion 3 at the other end thereof. It further comprises a ball and rod 4 at one end thereof having a spherical portion 5 which has high sphericity and which is rotatably and movably secured with minimum necessary clearance in the spherical receiving portion 2 of the aforesaid holder 1. The ball and rod 4 comprise a connecting portion 6 at the other end thereof. The ball joint further comprises a sealing member 7 which is located between the aforesaid spherical portion 2 and a base portion of the connecting portion 6 of the ball and rod 4. The sealing member 7 serves to accommodate lubricant such as grease which is supplied between the aforesaid spherical portion 5 and the spherical receiving portion 2. And it also serves to prevent entrance of dust and so forth into the portion between this spherical portion 5 and the spherical receiving portion 2. The aforesaid holder 1 is formed in such a manner that the spherical receiving portion 2 has an opening arranged substantially at a right angle with respect to the connecting portion thereof. An oil basin portion 9 which is closely sealed by a cover material 8 is formed at the bottom portion of spherical receiving portion 2 of the holder 1.

The cover material 8 which forms the aforesaid oil basin 9 employed in this embodiment is composed of a thin disc plate. It is fixed by caulking an annular projection 10 which is provided around the circumference of an opening which serves as the oil basin 9 by casing the holder 1, the opening being formed at the bottom portion of the spherical receiving portion 2. The connecting portion 3 of the aforesaid holder 1 is formed in the shape of internal threads 3a. The connecting portion 6 of the ball and rod 4 is formed in the shape of outer threads 6a. A hexagonal tool securing portion 11 which serves to be secured by a tool for rotating the ball and rod 4 at the time of securing the outer threads 6a to the other member is formed in the base portion of the ball and rod 4. A tool securing portion 12 in a substantially rectangular shape to which a tool is secured is also formed at one end of the connecting portion 3 of the holder 1. Furthermore, one end portion 7a of the aforesaid sealing member 7 is secured to the aforementioned tool securing portion 11. The other end 7b is secured to the edge of the opening of the spherical receiving portion 2, a lubricant pocket 13 thus being formed therebetween. An edge surface 14 is formed in the edge portion of the opening of the spherical receiving portion 2 of the aforesaid holder 1 for the purpose of regulating a moving angle of the ball and rod 4 which is secured by this spherical receiving portion 2.

The manufacturing method of the ball joint according to the present invention will now be described.

The holder 1 is cast with a spherical body 4a as a core. The spherical body 4a which is accommodated in the cast holder 1 and the main body 4b of the rod is projection welded so as to manufacture a ball and rod 4.

Figure 4:
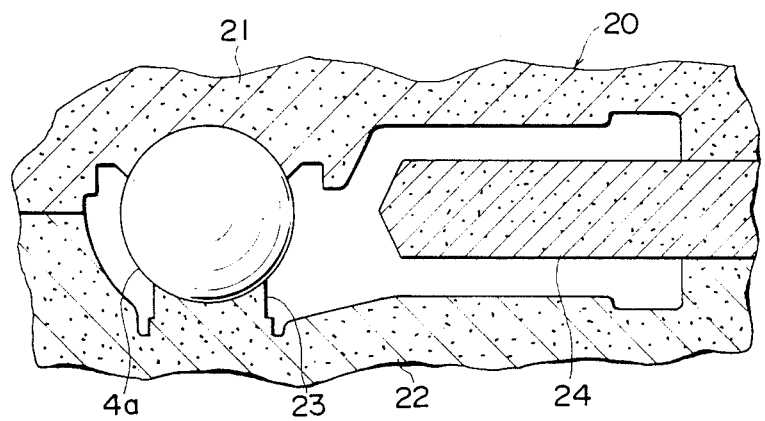
FIG. 4 illustrates a method of manufacturing a holder with a spherical body used as a core.
Figure 5:
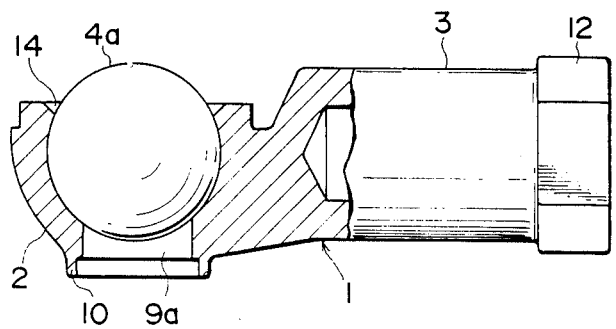
FIG. 5 is a partial cross sectional view illustrating the holder in which a spherical body is cast.
Figure 6:
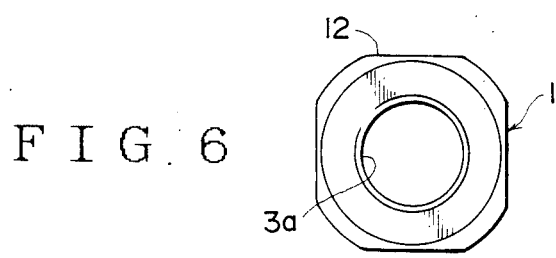
FIG. 6 is a right side view of FIG. 5.
Figure 7:
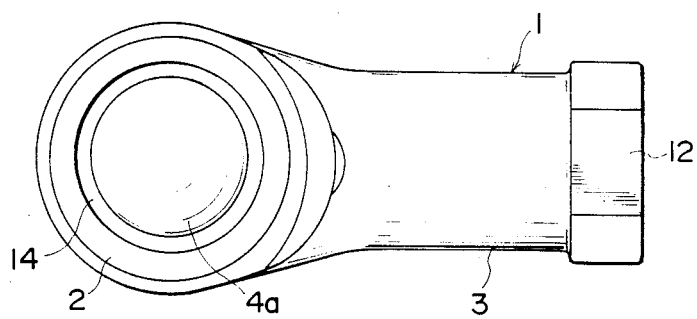
FIG. 7 is a plan view of FIG. 5.
Figure 8:
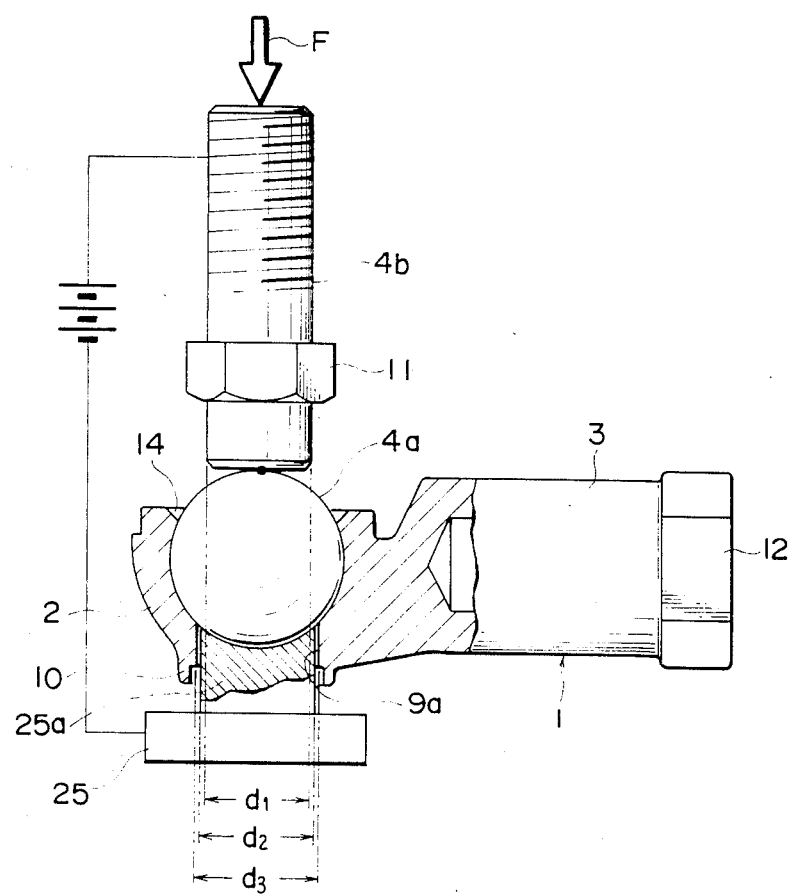
FIG. 8 illustrates a method of joining a spherical body which is cast in a holder and a main body of a rod by projection welding.
Figure 9:
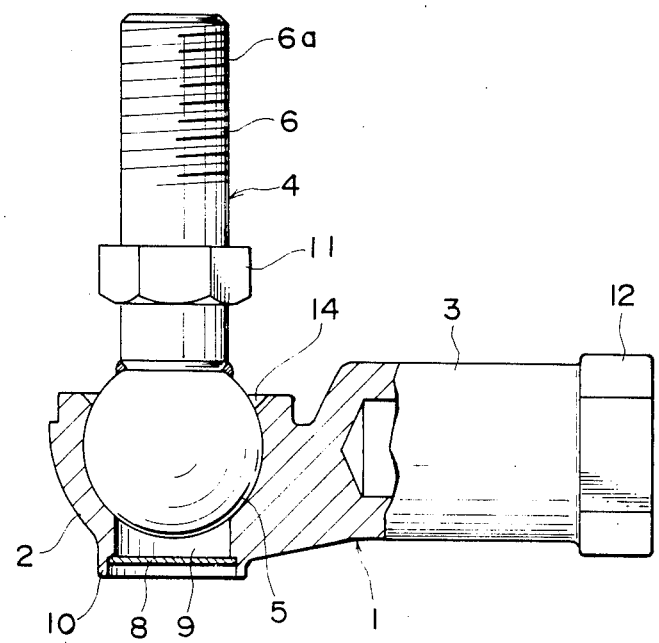
FIG. 9 is a cross sectional view illustrating a ball and rod and a holder which are formed by projection welding shown in FIG. 8.

That is, as shown in FIG. 4, the spherical body 4a having high sphericity is set as a core of the spherical receiving portion 2 in a holder casing die 20 which is vertically divided. next, the spherical body 4a which is used as a core is inserted between an upper die member 21 and a sphere receiving portion 23 which is provided on lower die member 22 and the diameter of which is larger than that of the lower portion of the main body 4b of the rod which forms a connecting portion 6 of the ball and rod 4 for the purpose of fixing. A core 24 for forming the inner threads 3a is set at the portion which forms the connecting portion 3 of the holder 1. Then, a die-cast fusible alloy is cast into the holder casting die 20 so as to cast the holder 1. In the cast holder 1, as shown in FIGS. 5 to 7, the spherical body 4a which becomes spherical portion 5 of the ball and rod 4 is cast and held in the spherical receiving portion 2 of the holder 1. An opening 9a which becomes an oil basin 9 is formed in the bottom portion of the aforesaid spherical receiving portion 2. An annular projection 10 which is caulked at the time of fixing the cover material 8 is formed in the circumference of the edge of the opening. In this embodiment, the inner threads 3a and the tool securing portion 12 are formed, in this state, in the connecting portion 3 of the holder 1. After casting the holder 1 in which the spherical body 4a is cast, as shown in FIG. 8, a supporting electrode 25 for projection welding is inserted through the opening 9a which is formed by the sphere receiving portion 23 of the lower die member 22 in the bottom portion of the holder 1 at the time of casting the holder 1 so as to support the spherical body 4a. The spherical body 4a and the main body 4b of the rod are abutted against with each other at their ends. Under a predetermined pressure F a predetermined electric current is passed for a predetermined weld time for the purpose of projection welding these ends. The electric current is again passed through main body 4b and spherical body 4a for the purpose of tempering. The holder 1 in which a spherical body 5 of the ball and rod 4 cast in the spherical receiving portion 2 is thus formed. Usage of the aforesaid supporting electrode 25 in which diameter d2 of its supporting portion 25a is larger with respect to the diameter d1 of the aforesaid main body 4b of the rod, and smaller with respect to the diameter d3 of the opening 9a, as a result of which, it does not contact the circumferential surface of the opening 9a (that is, the relationship is: $d1 < d2 < d3$) for efficient projection welding between the spherical body 4a and the main body 4b of the rod. Furthermore, the spherical body 4a and the main body 4b of the rod can be welded without any deterioration in smoothness and sphericity of the spherical body 4a to which the supporting electrode 25 is in contact. In order for the spherical portion 5 of the ball and rod 4 to be able to rotate and more with respect to the spherical receiving portion 2 of the holder 1, a small space is formed between the sphere receiving portion 2 of the holder 1 which has been thus formed and the spherical portion 5 of the ball and rod 4 by applying an outside force by, for example, applying a small impact by patting the outer circumference of the aforesaid sphere receiving portion 2, or applying a tension to the ball and rod 4. Then the opening 9a which is formed at the bottom portion of the sphere receiving portion 2 of the holder 1 is filled with the lubricant such as grease and so forth. The cover member 8 is then fitted into the edge of this opening 9a and the annular projection 10 which is formed in the circumference of this opening 9a is caulked so as to form the oil basin 9 with this cover member 8 fixed to the edge of the opening 9a.

Furthermore, as shown in FIG. 1, the sealing member 7 is secured to the portion between the edge of the opening in the sphere receiving portion 2 of the holder and the tool securing portion 11 which is formed at base portion of the connecting portion 6 of the ball and rod 4. Then the lubricant pocket 13 which is formed by this sealing member 7 is filled with the lubricant such as grease and so forth.

What is claimed is:

1. A ball joint consisting essentially of:
    a holder having a sphere receiving portion at one end thereof and a connecting portion at the other end, said holder including said sphere receiving portion being formed in a single unitary structure;
    a ball and rod having a spherical portion at one end which is rotatably and movably held in said sphere receiving portion and a connecting portion at the other end;
    a sealing member which is secured between said sphere receiving portion of said holder and a base portion of said connecting portion of said ball and rod, and which accommodates lubricant and acts to prevent entrance of dust and so forth;
    an opening formed at a bottom portion of said sphere receiving portion of said holder by a sphere supporting portion of a die for fixing said sphere when casting said holder with the use of said sphere which forms said spherical portion of said ball and rod as a core; and
    a cover member insertable into said opening to form an oil basin in said opening between said cover member and said ball.

2. A ball joint according to claim 1 wherein diameter of said opening which is formed in the bottom portion of said sphere receiving portion of said holder is substantially same as or larger than the diameter of said connecting portion of said ball and rod.

3. A ball joint according to claim 1 or 2 wherein a ball and rod having high sphericity which is manufactured by projection welding a main body of said rod and said spherical body is used as said ball and rod.

* * * * *